United States Patent [19]

Michel

[11] 4,196,165

[45] Apr. 1, 1980

[54] PROCESS FOR THE PRODUCTION OF ORIENTED HOLLOW PLASTIC BODIES

[75] Inventor: Edmond Michel, Brussels, Belgium

[73] Assignee: Solvay & Cie., Brussels, Belgium

[21] Appl. No.: 875,501

[22] Filed: Feb. 6, 1978

Related U.S. Application Data

[63] Continuation of Ser. No. 650,760, Jan. 20, 1976, abandoned.

[30] Foreign Application Priority Data

Feb. 26, 1975 [FR] France .................. 75 06507

[51] Int. Cl.² .............................................. B29C 17/07
[52] U.S. Cl. ........................................ 264/530; 264/532;
264/535; 425/529; 425/535
[58] Field of Search .................. 264/89, 94, 96–99,
264/529, 530, 532, 535, 537, 538, 540–543;
425/529, 533, 535

[56] References Cited

U.S. PATENT DOCUMENTS

| | | | |
|---|---|---|---|
| 3,164,646 | 1/1965 | Fischer | 425/535 X |
| 3,202,739 | 8/1965 | Zavasnik | 264/98 |
| 3,371,376 | 3/1968 | Fischer et al. | 425/535 X |
| 3,412,188 | 11/1968 | Seefluth | 264/92 |
| 3,470,282 | 9/1969 | Scalora | 264/97 |
| 3,754,851 | 8/1973 | Reilly et al. | 264/98 X |
| 3,865,530 | 2/1975 | Jessevallee et al. | 425/535 X |
| 3,900,120 | 8/1975 | Sincock | 215/1 C |

FOREIGN PATENT DOCUMENTS 707875 12/1967 Belgium.

*Primary Examiner*—Jan H. Silbaugh
*Attorney, Agent, or Firm*—Spencer & Kaye

[57] ABSTRACT

Production of oriented hollow plastic bodies having a more uniform wall thickness by formation of elongated preforms of which one end is closed and the other is open and has a molded neck, heat conditioning of the preforms at a temperature which allows the plastic to be oriented by stretching, introduction of the preforms into blow molds the cavities of which have a greater length than the length of the preforms and reproduce the shape of the desired hollow bodies and blowing of the preforms by introducing an expansion fluid into the preforms through their open end in which the expansion fluid is introduced into the preforms towards their bottom along a direction substantially parallel to their longitudinal axis and at a distance from their bottom which is between 20 and 60% of their length which is subjected to expansion.

13 Claims, 1 Drawing Figure

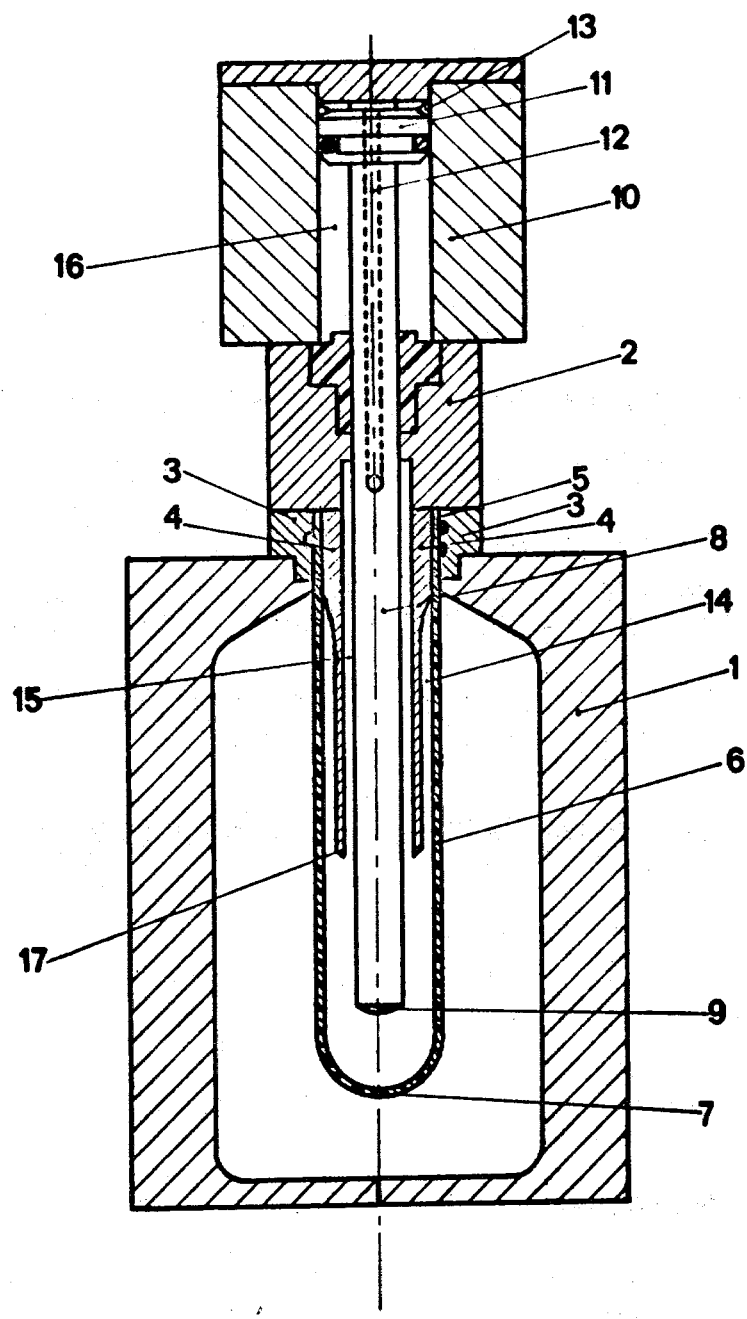

PROCESS FOR THE PRODUCTION OF ORIENTED HOLLOW PLASTIC BODIES

CROSS REFERENCE TO RELATED APPLICATION

This application is a continuation of Applicant's copending U.S. application Ser. No. 650,760, filed Jan. 20, 1976 now abandoned.

The present invention relates to a process for the production of oriented hollow plastic bodies which have a very uniform wall thickness and can be produced at very high cycle speeds, and to a device which is particularly suitable for carrying out this process.

It has been known for at least a decade that it is possible to produce, by blow-moulding, hollow plastic bodies which have markedly improved mechanical characteristics, by employing preforms heated to a temperature which favours the orientation of the macromolecules during the stretching caused by the blowing process.

Thus, U.S. Pat. No. 3,470,282, filed on Apr. 24, 1963 in the name of OWENS ILLINOIS GLASS CO., proposes a process for the production of oriented hollow bodies which consists of producing preforms by injection moulding, heat-conditioning these preforms in their injection mould, longitudinally stretching these conditioned preforms and finally converting these stretched preforms to their definitive shape by blowing in a suitable mould.

However, it appears that employing an injection moulding technique for the production of the preforms, and employing a heat conditioning of the latter in the injection moulds, results in a very slow method of operation which does not permit the use of high production cycle speeds.

It has furthermore been found that this technique does not permit the production of oriented hollow bodies which have a very uniform wall thickness and that as a result the anticipated improvement in the mechanical properties is limited to the improvement achieved in the thinnest parts.

In order to deal with this latter disadvantage, U.S. Pat. No. 3,412,188, filed on Jan. 10, 1966 in the name of PHILLIPS PETROLEUM CO., proposes to employ preforms having a variable wall thickness, and U.S. Pat. No. 3,202,739, filed on Feb. 26, 1962 in the name of the same company, proposes setting up a longitudinal temperature gradient in the wall of the conditioned preform.

However, though these techniques probably result in an improvement as regards the uniformity of the thickness of the walls, they nevertheless remain dependent on production of preforms by injection moulding and as a result in no way improve the output.

In order to make higher productivity possible, techniques have been proposed, more recently, in which the preforms are produced by blow-moulding. Thus, Belgian Patent No. 707,875, filed on Dec. 12, 1967 in the name of UNILEVER, has described the production of oriented hollow bodies from resins based on vinyl chloride in accordance with a technique which involves the production of preforms by blow-moulding, the heat conditioning of these preforms and the final blowing in a suitable mould.

However, on following this procedure, substantial irregularities in the wall thickness of the oriented hollow bodies thus obtained are again found.

In order to deal with this shortcoming, it has, in conclusion, recently been proposed, in U.S. Pat. No. 3,754,851, filed on June 1, 1971 by MONSANTO CO., to produce the preforms by blow-moulding of pieces of parison delivered by an extrusion head which permits programming the wall thickness. However, this technique appears to be delicate and requires the use of expensive extrusion heads and regulating equipment. Furthermore, the danger of an accidental shift in the programme, which can lead to an aggravation of the irregularities in the hollow bodies produced, is always present.

There has now been developed, in accordance with the present invention, a very simple process for the production of oriented hollow plastic bodies which permits using preforms obtained by blow-moulding and hence permits the use of very high production cycle speeds, and which gives hollow bodies which reliably have a very uniform wall thickness.

The present invention relates to a process for the production of oriented hollow plastic bodies which comprises the following successive stages:

(1) the formation of elongated preforms of which one end is closed and the other is open and has a moulded neck, (2) the heat conditioning of the preforms at a temperature which allows the plastic to be oriented by stretching, (3) the introduction of the preforms into the blow moulds, the cavities of which have a greater length than the length of the preforms, and reproduce the shape of the desired hollow bodies and (4) blowing of the preforms by introducing an expansion fluid into the preforms through their open end, in which the expansion fluid is introduced into the preforms towards their bottom along a direction substantially parallel to their longitudinal axis and at a distance from their bottom which is between 20 and 60% of their length which is subjected to expansion.

The preforms which are blown in accordance with the invention can be manufactured by any known method, for example by thermoforming a sheet, by injection or by moulding a length of tubular parison. However, it is preferred to manufacture the preforms by blowing a portion of tubular parison, as is described in French Patent Applications Nos. 74/05,461 of Feb. 14, 1974, corresponding to U.S. application Ser. No. 543,932, filed Jan. 24, 1975, now U.S. Pat. No. 4,007,242 and 74/09,380 of Mar. 15, 1974, corresponding to U.S. application Ser. No. 557,376, filed Mar. 11, 1975, now U.S. Pat. No. 4,049,761 in the name of Solvay & Cie. This method of manufacture of the preforms makes it possible to satisfy two requirements, namely high productivity and good quality of the preforms, which it is not possible to satisfy by the other means.

The preforms employed have an elongated general shape. They can have a cross-section which decreases slightly from the open end to the base. However, it is preferred to use preforms which have a cylindrical body and a hemispherical base, such as those described in the above-mentioned French Patent Application No. 74/05,461. The preforms used according to the invention have, at their open end, a neck portion which is already moulded in its definitive shape. The part of the preforms subjected to expansion is that located below this part of the neck.

To achieve the desired result it is furthermore important that the preforms should be so produced that the thickness of their wall in the part which is subjected to expansion is as uniform as possible.

Furthermore, in order to permit the production of hollow bodies which have good longitudinal orientation, the length of the preforms is less than the height of the desired hollow bodies. As a general rule, it is preferred that the ratio of the length of the preforms to the height of the desired hollow bodies should be between 0.85 and 0.15.

In order also to induce good axial orientation in the wall of the hollow bodies produced, it is also desirable that the preforms should have a markedly smaller cross-section than that of the desired hollow bodies. Preferably, the ratio of these two cross-sections is chosen to be between 2 and 10.

Before being blown in accordance with the invention, the preforms are heat-conditioned so as to bring the material of which they consist to a temperature at which it is possible to orient it by stretching. This temperature varies as a function of the nature of the plastic used for the production of the preforms. In order to carry out the process successfully, it is important that the temperature of the preforms should be uniform and in particular that the preforms should not exhibit a longitudinal temperature gradient.

In order to attain the desired result, the expansion fluid should be introduced along a direction substantially parallel to the longitudinal axis of the preforms. However, results which are still satisfactory can be achieved if the direction of injection of the expansion fluid and the longitudinal axis of the preforms are at a small angle to one another. As a general rule, it is preferred that this angle should be kept at a value less than 30°.

It has been observed that the best results are obtained if the expansion fluid is introduced through a circular slit of which the centre is on the longitudinal axis of the preforms. To achieve the optimum result, the slit should be at a distance of less than 10 mm, preferably of between 1 and 5 mm, from the internal wall of the preforms. Obviously any other device than a circular slit, for example a series of orifices arranged in a circle, which allows the introduction of the expansion fluid in the form of a cylindrical stream, is equally suitable.

The direction at which the expansion fluid is introduced into the preform depends on the direction of the feed channel. Hence the latter should, at least in its terminal part, be substantially parallel to the longitudinal axis of the preforms.

The distance which separates the point of introduction of the expansion fluid from the base of the preforms is chosen in accordance with the shape of the bases of the desired hollow bodies. The optimum distance can advantageously be determined experimentally. The best results are obtained if this point is at a distance from the base which is between 30 and 50% of the length of the preforms which are subjected to expansion.

According to a preferred variant, during the longitudinal stretching of the preforms in the course of blowing, the preforms are guided in their travel towards the base of the moulds by a centering piston introduced into the preforms through their open end. This piston moves and drives the base of the preforms which are being blown towards the base of the moulds, in synchronisation with the introduction of the expansion fluid. The travel of the centering piston can be controlled by mechanical, pneumatic or hydraulic means regulated by a suitable regulator such as, for example, a programmer. According to a preferred embodiment, the travel of the centering piston is controlled by the expansion fluid itself, which automatically ensures perfect synchronisation. This piston can advantageously be used to delimit, towards the inside, the circular slit through which the expansion fluid is preferably introduced.

Obviously the section of this piston must, at all levels below the point of introduction of the expansion fluid, be less than that of the inside of the preforms, so as to leave an empty space between the internal wall of the preforms and the piston.

It has been found that it is preferable that the end of the centering piston should not be in contact with the base of the preforms in the initial stage of blowing, that is to say at the instant at which the introduction of the expansion fluid is started and at which normally the movement of the piston is initiated. Preferably, the end of the centering piston is at that stage located at a point between the base of the preforms and the point of introduction of the expansion fluid. The best results are obtained if the end of the piston is at a distance of between 1 and 10 mm from the base of the preforms.

The expansion fluid, which is generally air or another fluid under sufficient pressure, is thus introduced into the space delimited by the centering piston and the internal wall of the preforms.

Finally, it is preferred that the surface of the end of the centering piston coming into contact with the base of the preforms should be as small as possible whilst taking into account the fact that the piston must not perforate the wall of the base of the preforms. It has, in fact, been found that the desired result is no longer achieved if this end has too large a surface, as is the case if it is intended to equip this end with a foot the cross-section of which is greater than that of the rod. Thus, the piston is preferably of constant cross-section and simply terminates in a rounded cap if the preforms have a cylindrical body and a hemispherical base.

It is possible to replace the centering piston by any other means which can, like the piston, serve to guide the preforms and centre them correctly in the blowing moulds whilst they are being expanded. Thus, for example, it is possible to envisage employing a system of movable jaws which seize the bases of the preforms by their external wall at the level of the base.

The process according to the invention lends itself particularly well to continuous production, at high cycle speeds, of oriented hollow bodies. Thus, for example, the preforms can be produced continuously by blow moulding, from a continuously extruded tubular parison, in consecutive moulds mounted on a rotary carrier which turns continuously. The preforms thus obtained can be transferred continuously to a second rotary machine equipped for carrying out the process according to the invention continuously. During the transfer, the preforms can be trimmed at the neck and heat-conditioned by passing through an appropriate oven. A device which can continuously carry out this sequence of successive operations is furthermore described in a Luxembourg patent application filed on Jan. 7, 1975 in the name of Solvay & Cie., and corresponding to U.S. application Ser. No. 647,072, filed Jan. 7, 1976 now abandoned.

The process of the invention can be used to manufacture bioriented hollow bodies from any plastic which is capable of being oriented by stretching. In general, plastics which can be spun are very suitable. In particular, the process can be carried out starting from preforms produced from acrylonitrile polymers of preponderant acrylonitrile content, such as acrylonitrile/methyl acrylate and acrylonitrile/styrene copolymers, thermoplastic polyesters such as poly(ethylene glycol terephthalate) and linear polyolefines such as isotactic polypropylene.

The bioriented hollow bodies obtained according to the invention are used especially for the packaging of carbonated drinks, or drinks which are sensitive to the effect of oxygen. They are characterised by remarkable mechanical properties and especially very good resistance to breakage when dropped, which properties are the result of the uniformity of the wall of the bodies. In particular, their lower part, which is the exposed part when the bodies are dropped, proves to be particularly strong.

To carry out the process according to the invention, there has been developed a particular device which also forms part of the present invention.

The device according to the invention consists of an assembly which comprises:

(1) A blow mould of which the cavity reproduces the shape of the desired hollow bodies and (2) a blow nozzle comprising a head suitable for holding a preform by its neck and for introducing it into the blow mould, and an axially displaceable centering piston so arranged as to penetrate into the preform, in which assembly the centering piston is surrounded, over a part of its length, by a coaxial sleeve which defines, between the piston and the sleeve, a space which is connected to a source of fluid under pressure.

In this device, the length of the sleeve which enters the preform determines the level at which the expansion fluid is introduced axially into the preform in the annular space between the centering piston and the internal wall of the preform. This length is so chosen as to satisfy the condition imposed by the process according to the invention regarding the distance separating the base of the preform from the point of axial injection of the expansion fluid.

The device according to the invention is furthermore explained in more detail in the description which now follows of a preferred embodiment in which the travel of the centering piston is controlled by the expansion fluid. However, this description given purely by way of illustration of course in no way limits the scope of the present invention.

In this description, reference will be made to the single FIGURE in the attached drawing, which schematically represents a cross-section, in side view, of a device according to the invention.

As can be seen in the FIGURE, the device comprises a blow mould 1 and a blow head 2. The blow head 2 is equipped with means 3,4 capable of holding a preform 6, possessing a hemispherical base 7, by its neck 5.

The blow head comprises a centering piston 8 which can travel axially and is introduced into the preform 6 so as to leave a free space between its end 9 and the base 7 of the preform.

The piston 8 is controlled via the cylindrical chamber 10 in which a control piston 11 mounted on the end of the piston 8 can slide.

The piston 8 possesses an internal channel 12 which communicates with the upper part 13 of the cylindrical chamber 10.

The piston 8 is furthermore surrounded, over a part of its length, by a coaxial sleeve 14, and the channel 12 opens out into the annular space 15 delimited by the piston 8 and the sleeve 14.

Finally, channels which are not shown make it possible periodically to connect the upper part 13 and the lower part 16 of the cylindrical chamber 10 either to the atmosphere or to a source of expansion fluid which is at a sufficient pressure.

The mode of operation of the device is very simple to appreciate. At the instant at which a preform 6 which has been heat-conditioned is introduced into the mould 1, the device is in the position recorded in the FIGURE.

At that instant the lower chamber 16 is connected to the atmosphere whilst the upper chamber 13 is connected to a source of expansion fluid which is at the required pressure.

As a result of this fact, the piston 11 is driven towards the bottom of the cylindrical chamber 10 and the end 9 of the piston 8, which is integral therewith, descends and comes into contact with the base of the preform 6.

At the same time, the expansion fluid flows through the channel 10 and the space 15 and is injected axially into the preform 6 at the level of the end 17 of the sleeve 14, the injection taking place between the piston 8 and the internal wall of the preform.

As a result of this, the preform 6 is deformed and brought up against the walls of the mould 1, so as to produce the desired oriented hollow body whilst conforming to the process according to the invention.

After a few seconds which are needed to cause the hollow body to cool, the upper part 13 of the cylindrical chamber 10 is in turn connected to the atmosphere whilst the lower part 16 is connected to the source of expansion fluid. As a result, the interior of the moulded hollow body is returned to atmospheric pressure and the piston resumes its starting position.

After opening the mould, the oriented hollow body thus moulded can be released from the mould and a new cycle can be started.

EXAMPLE

The apparatus described above is used to blow a preform which has a general shape similar to that shown in the FIGURE and is produced from an acrylonitrile/methyl acrylate copolymer containing 75% by weight of acrylonitrile. The thickness of the wall of the preform is uniform in the part located below the neck and is 2 mm. The height of the preform is 15 cm and the internal diameter is 20 mm. The temperature of the preform, which is also uniform, is 100° C. at the instant at which the preform is introduced into the blow mould.

This preform is used to manufacture a bioriented bottle which has a height of 18 cm and a diameter of about 55 mm. This bottle has the same general shape as the cavity of the mould shown in the FIGURE.

The blow nozzle is provided with a centering piston of constant diameter equal to 14 mm. In the initial stage, the base of the piston is at a distance of 3 mm from the base of the preform. The centering piston is provided with a sleeve up to a distance of 40 mm from the base of the preform. The annular slit between the piston and the sleeve is 1 mm.

Air under a pressure of 15 kg/cm$^2$ is used for the blowing, which is carried out under normal conditions.

The bottle thus obtained, when subjected to a creep test at 4 kg/cm$^2$ and 40° C. for 1 week, dilates by 1% in diameter in the zone where the dilation is a maximum whilst a similar bottle, but blown through a nozzle of which the sleeve stops at the level of the neck, dilates by 2% in the region where the dilation is a maximum.

I claim:

1. Process for the production of oriented hollow plastic bodies having a very uniform wall thickness which comprises successive stages,
    (1) forming elongated preforms, each having a uniform wall thickness in the part thereof subjected to expansion, a closed end and an open end having a molded neck,
    (2) heat conditioning the preforms at a uniform temperature which allows the plastic to be oriented by stretching,
    (3) introducing the preforms into blow moulds, the cavities of which have a greater length than the length of the preforms, and which reproduce the shape of the desired hollow bodies, and
    (4) blowing the preforms by introducing an expansion fluid into the preforms through a feed channel which is substantially parallel to the longitudinal axis of the preforms, the improvement wherein the expansion fluid is injected axially into the preforms towards their bottom so that the expansion fluid strikes the bottom of the preform in an axial direction, the expansion fluid being injected into the preforms at a distance from their bottom which is between 20 and 60% of their length which is subjected to expansion.

2. Process according to claim 1, wherein the angle formed between the direction of the expansion fluid and the longitudinal axis of the preforms is less than 30°.

3. Process according to claim 1, wherein the expansion fluid is introduced through a circular slit of which the centre is on the longitudinal axis of the preforms.

4. Process according to claim 3, wherein the circular slit is at a distance of less than 10 mm from the internal wall of the preforms.

5. Process according to claim 3, wherein the expansion fluid is introduced into the preforms in the annular space delimited by a centering piston and the internal wall of the preforms.

6. Process according to claim 5, wherein the expansion fluid is injected axially into the preforms at the level of the end of the centering piston.

7. Process according to claim 5, wherein at the initial stage of blowing of the preforms the end of the centering piston is at a distance from the base of the preforms.

8. Process according to claim 7, wherein the distance between the centering piston and the base of the preforms is between 1 and 10 mm.

9. Process according to claim 1, wherein the preforms are produced by blow moulding.

10. Process according to claim 9, wherein the preforms are provided with a hemispherical base.

11. Process for the production of oriented hollow plastic bodies having a very uniform wall thickness which comprises the following successive stages,
    (1) forming elongated preforms, each having a uniform wall thickness in the part thereof subjected to expansion, a closed end and an open end having a molded neck,
    (2) heat conditioning the preforms at a uniform temperature which allows the plastic to be oriented by stretching,
    (3) introducing the preforms into blow moulds, the cavities of which have a greater length than the length of the preforms, and which reproduce the shape of the desired hollow bodies, and
    (4) blowing the preforms by introducing an expansion fluid into the preforms through a feed channel which is substantially parallel to the longitudinal axis of the preforms, the improvement wherein the expansion fluid is injected axially at a pressure of 15 kg/cm$^2$ into the preforms towards their bottom so that the expansion fluid strikes the bottom of the preform in an axial direction, the expansion fluid being injected into the preforms at a distance from their bottom which is between 20 and 60% of their length which is subjected to expansion.

12. Process as defined in claim 11 wherein the expansion fluid is introduced at a distance of 40 mm from the bottom of the preforms.

13. Process as defined in claim 12 wherein the height of the preform is 15 cm, the thickness of the wall of the preform is 2 mm, and the temperature of the preform is 100° C. at the instant at which the preform is introduced into the blow mould.

* * * * *